United States Patent [19]
Yoshida et al.

[11] 3,870,704
[45] Mar. 11, 1975

[54] NITROGEN CONTAINING AMYLOSE DERIVATIVES

[75] Inventors: Mikihiko Yoshida; Shokichi Yuen, both of Okayama, Japan

[73] Assignee: Hayashibara Company, Okayama, Japan

[22] Filed: Dec. 4, 1972

[21] Appl. No.: 311,777

Related U.S. Application Data

[63] Continuation of Ser. No. 112,405, Feb. 3, 1971, abandoned.

[30] Foreign Application Priority Data

Feb. 3, 1970 Japan.................................. 45-9428

[52] U.S. Cl.... 260/233.3 R, 117/139.5 C, 117/156, 117/165, 195/31 R, 195/31 P, 260/77.5 B, 260/233.3 A, 260/233.5
[51] Int. Cl............................................. C08b 19/06
[58] Field of Search... 260/233.3 A, 233.3 R, 233.5, 260/77.5 B; 195/31 R, 31 P

[56] References Cited
UNITED STATES PATENTS

| 2,725,362 | 11/1955 | Gaver et al. | 260/17.3 |
| 3,169,076 | 2/1965 | Borchert | 260/233.3 |

Primary Examiner—Melvyn I. Marquis
Attorney, Agent, or Firm—Browdy and Neimark

[57] ABSTRACT

The present invention relates to nitrogen containing short chain water soluble amylose derivatives produced by subjection of starch to the actions of alpha-1,6-glucosidases, and reaction of urea or urea derivatives with the resultant short chain amyloses with polymerization degrees (D.P.) of 15-50. Primary alcohols and polyalcohols react with urea to form into corresponding nitrogen containing derivatives respectively.

2 Claims, No Drawings

NITROGEN CONTAINING AMYLOSE DERIVATIVES

This is a continuation of application Ser. No. 112,405 filed Feb. 3, 1971, now abandoned.

The present invention relates to nitrogen containing short chain water soluble amylose derivatives produced by subjection of starch to the actions of alpha-1, 6-glucosidases, and reaction of urea or urea derivatives with the resultant short chain amyloses with polymerization degrees (D.P.) of 15–50. Primary alcohols and polyalcohols react with urea to form into corresponding nitrogen containing derivatives respectively. When urea is heated to a temperature above its melting point it decomposes into cyanic acid and ammonia. The fact, however, that urea forms carbamates and allophanates in the presence of alcohols is widely known.

Since amylose may be regarded as one type of polyalcohol, it is natural that when mixtures of urea and amylose are heated to a temperature above the melting point of urea in the absence of catalysts the above mentioned reaction occurs and amylose carbamates are formed.

In "Starch: Chemistry and Technology, Volume II, Industrial Aspects", Academic Press, 305–307, are described the facts that with the employment of toluene as a solvent, starch and urea react to form starch carbamates, that a similar reaction occurs using water as a solvent, and that this reaction is accelerated with the presence of potassium acetate, and that starch reacts similarly with urea derivatives as well as with urea and forms into nitrogen containing starch derivatives. In addition, the reference describes that these resultant products react easily with aldehydes, including formaldehydes, and the like. The present invention, based on the above findings, is characterized in the production of short chain amylose carbamates with novel properties, low viscosities, and higher water solubilities. These compounds, which were heretofore unobtainable with the employment of conventional starches, amyloses and amylopectins, becomes possible using as starting material relatively short chain amylose which has a higher water solubility and consists of short chain amylose with D.P. of about 15–50 (hereinafter referred to as "short chain amylose"). In addition the invention relates to the production of water insoluble and nitrogen containing amylose derivatives, comprising methylolation of such short chain starch carbamates with aldehydes such as formaldehydes and then heating the products. More particularly the present invention relates to processes comprising simultaneously by melting, decomposing and condensing mixtures of urea and short chain amylose by a reaction of from 10 minutes to 5 hours with or without the employment of catalysts, such as potassium acetate and the like. In addition the invention is employable in forming products with different degrees of urethanation, comprising suspension of short chain amylose and urea in solvents, such as dimethyl formamide, formamide, etc., that are capable of dissolving reaction products, and reacting the suspension by heating it to above 132°C, the melting point of urea, for 10 to 15 minutes with or without the addition of catalysts in anyhydrous condition.

The reaction may be performed by heating at a temperature lower than the melting point of urea, for example, 120°C, for relatively prolonged periods of reaction. The above reaction products may also be obtained by admixing water and by admixing methanol or ethanol per se and subsequent precipitation. Since the products are water soluble, purification can be performed with ease by repetition of precipitating the aqueous mixture in methanol. The water solubility of the products is another characteristic as compared with carbamates obtained from conventional starches, amyloses, and amylopectins. It is possible to form the thus obtained short chain amylose carbamates into methylol compounds by reacting the products with formaldehyde under slight alkaline conditions at 40° to 60°C and to obtain water insoluble compounds upon heating the reaction products.

Accordingly, after such methylol compounds are applied on fabrics or fibers, water insoluble films form on the fabrics or fibers; thus it is possible to maintain the fibers in different shapes. Because short chain amylose has lower molecular weight and lower viscosity compared with those of the products using conventional starches, amyloses and amylopectins as starting materials, the products permeate with more ease into the deeper parts of the fabrics to which the products are applied and form uniform or homogenous films. Also the products have the advantage or preventing easy drop-away of the applied films by permeation of the applied products into the deeper parts of the fabrics. Once water insoluble films are formed within fabrics by treating the fabrics with such short chain amylose carbamate compounds, it is possible to maintain the effects of coating on the fabrics indefinitely without further use of starch pastes.

The present invention is characterized in the production of nitrogen containing short chain amylose derivatives by reacting the short chain amylose produced according to another invention of the inventors, and urea or urea derivatives according to either of the following methods. (a) Reacting the mixture at above or below the melting point of urea in the presence or absense of catalysts, such as potassium acetate. (b) Reacting the mixture in solvents, such as dimethyl formamide, formamide, etc., under anhydrous conditions with or without the employment of a catalyst at a temperature above or lower than the melting point of urea. Such amylose carbamates may be formed into water soluble methylol compounds by methylolation with aldehydes, e.g. formaldehyde, under slight alkaline conditions, and such methylol compounds can be derived in turn into water insoluble and nitrogen containing short chain amylose derivatives by heating the substance. Moreover, such carbamates have various useful applications, including material for the production of coating agents, binders and sizing agents for paper and fabrics.

The amylose employable in the present invention may be prepared by debranching the alpha-1,6-glucosidic bonds of amylopectin present in starches with the employment of alpha-1,6-glucosidases or debranching enzymes derived from cultivation of strains of *Pseudomonas amyloderamosa* ATCC 21216, or *Escherichia intermedia* ATCC 21073, etc.

Accordingly starch comprising 70–80 percent by weight of short chain amylose, D.P. about 15–50, which corresponds with the branched chain length of amylopectin, and 20–30 percent by weight of long chain amylose, is obtainable by treating native common starches, (corn starch, sweet potato starch, potato starch, tapioca starch, and other varieties of starches). Subsequently the resulting product is cooled gradually whereupon long chain amylose (20–30 percent by weight of the resultant) precipitates. After the long chain amylose is isolated from the reaction mixture, the remainder, 70–80 percent by weight of the starch, will be short chain amylose, D.P. of 15–50, which is employable for the processes described in the present invention. When waxy starches are subjected to such enzymes, since long chain amylose is absent from the initial stage, only short chain amylose, D.P. about 15–50, is obtained, which may be employed 100 percent as a starting material for the processes described in the invention. The following examples are given for the purpose of illustration only and are not to be interpreted as specific limitations of this invention. All parts and percentages are given by weight unless stated otherwise.

EXAMPLE 1

A suspension prepared by admixing 20 grams of short chain amylose, an invention product of the present assignee, and which has a relatively high water solubility, 6 grams of urea and 20 ml of water, was converted into fluid state by heating in an oil bath at about 110°C and then water was removed by evaporation. When the temperature of the reaction solution reached about 110°C, the temperature of the oil bath was elevated gradually and reaction was carried out for 1 hour maintaining the temperature of the reaction solution at 135° to 140°C under agitating conditions.

By heating, the suspension became a solution. Until nearly complete evaporation of water, the solution exhibited a temperature of about 102°C, the temperature elevated when the lack of moisture content reached an appreciable degree. (Ammonia evolved during the reaction.) The reaction product was a slightly brown colored resinous material which solidified upon cooling. The resultant product was cooled to room temperature after completion of the reaction and dissolved in 50 ml of cold water. To the aqueous solution of the product was added about 50 ml of methanol and sticky precipitates formed. These procedures were repeated thrice and finally to the precipitates were added absolute methanol and pulverized, then a nearly white powder was obtained.

The yield was 16.1 grams. The nitrogen content of the product was 1.6 percent and degree of substitution (D.S.) of urethan, 18 (mole) percent.

To 50 ml of 10 percent aqueous solution of the powder was added 4.5 ml of 10 percent formalin. The mixture was then adjusted to pH 10, with sodium hydroxide, and reacted at 50°C for 3 hours with stirring, thus methyloled short chain amylose-urethan was obtained.

Such methyloled short chain amylose-urethan was a complete fluid in which no precipitate formed. To the aqueous methyloled short chain amylose solution was added 3 percent of Zn $(NO_3)_2$. Cotton fabric, and mixed yarned fabrics comprising cotton and synthetic fibers were immersed with the mixture and heated at 120°C for 30 minutes resulting in the formation of water insoluble and firm films within the fabrics. The fabrics thus treated maintained their initial starch coating stage even after several repetitions of vigorous washing in hot water.

EXAMPLE II 20 grams of short chain amylose, dried to an anhydrous state and 6 grams of urea (dry substance) were suspended in 50 grams of dimethyl formamide. The suspension was reacted at 140°C for 1 hour in an oil bath with gradual stirring. From around 120°C the suspension became gradually clear and, during the reaction, ammonia evolved. After the present solvent was removed by distillation under reduced pressure, the resultant was dissolved in water. To the aqueous solution was added an equivolume of methanol and then precipitated. After the procedures were repeated and the precipitates were purified, anhydrones mehtanol was added to the precipitates, comminuted, and dried. The obtained product was nearly white and water soluble. The product yielded was about 22 grams. The product had a nitrogen content of 1.9 percent, degree of substitution of urethan, 22 (mole) percent. After methylolating the product the product was insolubilized by heating according to the method in Example I. Thus a product with the same satisfactory results as those of Example I was obtained.

What we claim:

1. Amylose-O-CO-$NH_2$, wherein said amylose has a DP of 15–50.

2. Amylose-O-CO-NHCH$_2$OH, wherein said amylose had a DP of 15–50.

* * * * *